A. H. ILLINGWORTH.
BAIT CASTING REEL USED IN ANGLING.
APPLICATION FILED JULY 6, 1914.

1,187,840. Patented June 20, 1916.
2 SHEETS—SHEET 1.

WITNESSES;
John C. Sanders
Albert F. Heuman

INVENTOR
Alfred Holden Illingworth
By M. Wallace White
ATTY.

UNITED STATES PATENT OFFICE.

ALFRED HOLDEN ILLINGWORTH, OF WINDERMERE, ENGLAND.

BAIT-CASTING REEL USED IN ANGLING.

1,187,840.  Specification of Letters Patent.  Patented June 20, 1916.

Application filed July 6, 1914. Serial No. 849,310.

*To all whom it may concern:*

Be it known that I, ALFRED HOLDEN ILLINGWORTH, a subject of the King of Great Britain and Ireland, and resident of Dovenest House, Windermere, in the county of Westmoreland, England, merchant, have invented new and useful Improvements in or Relating to Bait-Casting Reels Used in Angling, of which the following is a specification.

This invention relates to a new or improved form of casting reel used in angling, and has among its objects to provide means and apparatus, for casting a spinning or other bait or tackle a long distance with ease even though the bait be extremely light, and for recovering the line.

My present invention relates more particularly to improvements in the type of reel disclosed in my British Patent No. 18,723 of 1910, and primarily consists in mounting the larger gear wheel upon a revoluble sleeve which also carries the handle rigidly at the other end. By this means the optional addition of a traversing motion is facilitated or made possible.

It is also desirable to simplify the release and reëngagement of the line, and my present invention contains as hereinafter described provision for what I term an automatic release which may be applied to any reels embodying my principle.

The new automatic release may be used not only with my present form of device, but with my previous ones and I may use the new form of reel either with or without the traverse motion and automatic release.

To facilitate rapid winding I may employ in connection with the winding handle an aperture, recess or thimble adapted to receive a finger.

Figure 1:
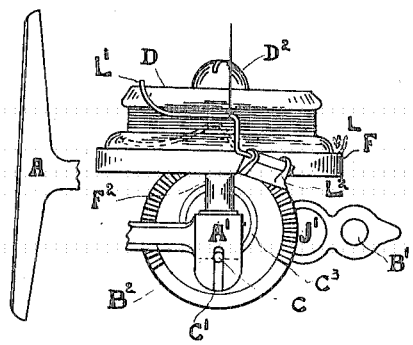
Figure 2:
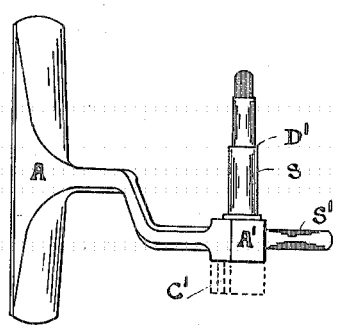
Figure 3:
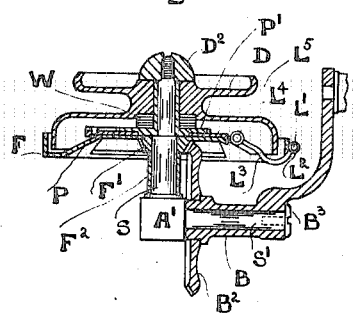
Figure 4:
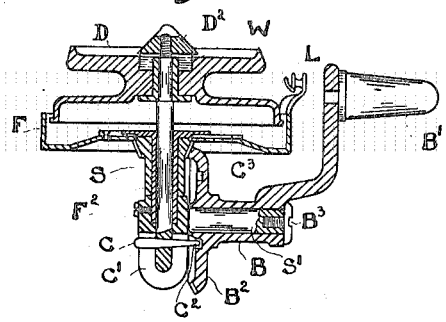
Figure 5:
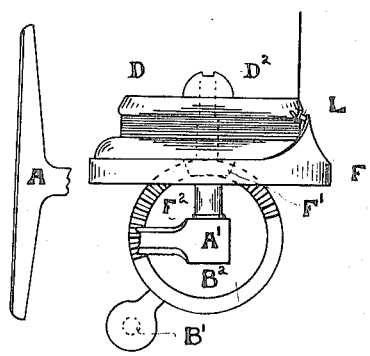
Figure 6:
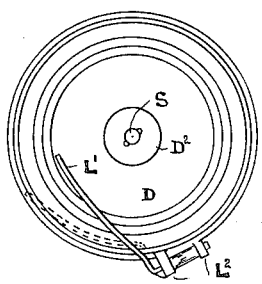
Figure 7:
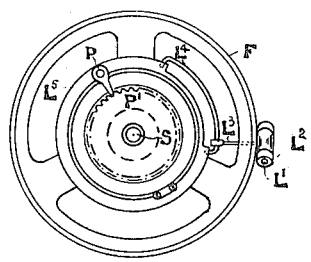
Figure 8:
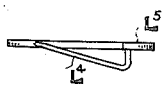
Figure 9:
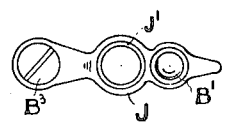

In describing my invention in detail reference is made to the accompanying sheets of drawings similar letters indicating similar parts in which:—Figure 1 represents an elevation of a reel according to my invention. Fig. 2 represents a view of the attaching bracket and shafts. Fig. 3 represents a sectional elevation of a reel with the traverse mechanism omitted. Fig. 4 represents a sectional elevation of a reel fitted with the mechanism for imparting traverse motion to the drum. Fig. 5 represents an elevation of a reel without the traverse mechanism. Fig. 6 represents top plan of a reel showing the line winding. Fig. 7 represents a plan with the drum removed showing line winding gear. Fig. 8 represents a detail and Fig. 9 represents a detail of a finger winding device.

To carry my invention into effect, I provide a bracket attachment A which is fitted to a rod in any ordinary or suitable manner. This bracket A is attached to or forms part of a fitting A' which carries two projecting spindles S and S' at right angles or substantially so to each other (Fig. 2), one S being substantially parallel to the rod. Spindle S' is adapted to carry a sleeve B (Figs. 3 and 4) which carries at one end a suitable handle such as B'. The other end of the sleeve carries a large gear wheel $B^2$.

The sleeve handle and wheel being attached to the spindle S' by means of a screw, bolt, or like $B^3$ or in any other convenient manner. The teeth of gear wheel $B^2$ engage on what I term the handle side of the spindle S teeth of a bevel wheel F' carried loosely on spindle S by sleeve $F^2$, and the wheel F' is attached to or forms part of the flier F which carries the line catching device. The spindle S is provided with a shoulder D' on which may rest a drum D which is secured in position on the spindle S by means of the nut $D^2$. The drum D may be so secured on spindle S that it may have a slight rotating motion on the influence of the pull of the line, and to this end suitable washers such as W may be employed. These washers may be carried in a space formed in the drum D immediately under the nut $D^2$ as shown in Fig. 4 or between the base of drum D and the flier F as shown in Fig. 3. I may however use other forms of braking devices to accomplish the same end, and on the number, thickness and arrangement of such devices will depend the ease or otherwise with which the drum will revolve.

In that form of invention having a traverse motion Figs. 1 and 4 the spindle S will be mounted in the fitting A' so as to have a rising and falling motion, but not a rotary one, and to this end pins may pass through the fitting A' and engage flats or notches on the said spindle, these are however not shown as the pin C working in a slot C' in the fitting A' and passing through the spindle S for its point $C^2$ to engage a cam slot $C^3$ in the wheel $B^2$ and so cause the spindle S and the drum D to rise and fall and thus give the desired traverse motion to the drum.

To provide the form of reel without the traverse motion it is only necessary to withdraw the point $C^2$ of pin C from the path $C^3$ and no traverse motion will result from the winding motion, a drum with a narrower groove being substituted. The shaft S may be suitably secured in the fitting A' or the slot $C^3$ may be omitted from the wheel $B^2$ and the fitting A', spindles S and S' and securing bracket may be all cast in one piece as shown in Fig. 1.

While I have described and shown a traverse motion which I find simple and efficient, I wish it to be understood that I may obtain such motion in other ways.

The automatic release referred to is shown in Figs. 1, 3, 6 and 7. This release and reengagement device for the line comprises a wire or the like guide L' suitably mounted in horizontal, vertical, or oblique bearings, such as $L^2$ on the side of a flier F, and attached to this guide L' by any suitable means is an end piece or crank $L^3$ passing into the interior of the flier to engage a guide rod $L^4$ suitably inclined and curved as shown in Fig. 8, and carried from a cast plate or stamping $L^5$ mounted between the flier and a drum, the said stamping being adapted to revolve with, but invariably to lag somewhat behind, the flier that is with a certain amount of drag. This may be accomplished either by employing a removable washer of compressible nature or by fixing the pawl of the usually fitted ratchet motion upon the plate $L^5$ as shown in Fig. 7 instead of arranging such pawl on the flier itself, the ratchet member P' may be mounted as shown in Figs. 3 and 7.

The guide L' will be suitably bent and Figs. 1 and 6 show a suitable form. To release the line and leave it upon the extended first finger of the rod hand the handle is turned backward and the free end of the guide drops downward and outward toward the edge of the drum as shown by dotted lines in Figs. 1 and 6 and remains well out of the way of the flying line while the cast is made. To engage the line the mere motion of winding raises the end of the guide L' and directs it upward and inward until it assumes the position shown by full lines in Figs. 1 and 6.

When the guide L' is employed the eye or guide L shown in Figs. 4 and 5 may be discarded.

I may mount the member $L^5$ in other ways than that described and give the necessary drag without employing a ratchet mechanism as in the arrangement shown and described which I find efficient.

Fig. 9 shows a device to provide for finger winding which with reels of the type described is of advantage. I may attach, or form therewith, to the handle B' a fitting J having a finger aperture J' so arranged as to be clear of the flier L in any position, and this aperture J' may be guarded to prevent access of the finger to the mechanism and such guard may comprise a thimble adapted to revolve in its bearings or simple guard bars across the aperture. Alternatively I may employ the handle B' to serve the same purpose hollowing same out for the reception of a finger, or I may extend the other end of the handle and provide same with a finger winding aperture or the like.

I may attach the spool or drum D to its spindle in any convenient manner so long as same does not impede the action of the mechanism, and I may employ drums constructed in a manner different to that shown and described.

What I claim as my invention is:

1. A casting reel for angling comprising a rod attaching bracket, a pair of non-rotatable spindles carried by the bracket, a winding drum mounted on one of said spindles, means for rendering said drum substantially stationary on the spindle, a rotatable flier having a line engaging portion mounted on said last mentioned spindle, a gear on said spindle and operatively connected with said flier, a sleeve rotatably mounted on the other of said spindles, a gear carried by said sleeve and adapted to mesh with said other gear, hand operating means carried by said sleeve for rotating said flier whereby the line is wound and unwound from said drum, and an automatic winding and releasing device for the line actuated by the winding and reverse movement of the hand operating means.

2. A casting reel for angling comprising a rod attaching bracket, two non-rotatable spindles carried by the bracket and arranged substantially at right angles to each other, a substantially stationary winding drum mounted on one of said spindles substantially parallel to the rod, a flier member mounted to revolve around said drum, means on the other spindle for revolving said flier, an automatic releasing and winding means on the flier for winding and unwinding the line on the drum, comprising a crank pivotally mounted on the flier, a cam for imparting a reciprocating movement to the crank for horizontally withdrawing the line winding means out of the way of the line when a cast is made, and for returning the winding means to its normal position when the winding of the line is commenced.

3. A casting reel for angling comprising a rod attaching bracket, a substantially stationary winding drum mounted on said bracket, a flier member mounted on said bracket to revolve around said drum, means carried on the bracket for revolving said flier member, an automatic releasing and winding means on the flier for winding the line on the drum and having a partially rotatable axis oblique to the axis of rotation of the flier for withdrawing the winding means horizontally when a cast is made and for returning the winding means to normal winding position when the winding is commenced.

4. A casting reel for angling comprising a rod attaching bracket, a pair of non-rotatable spindles carried by the bracket, a winding drum mounted on one of said spindles, means for rendering said drum substantially stationary on the spindles, a rotatable flier having a line engaging portion mounted on said last mentioned spindle, a gear on said spindle and operatively connected with said flier, a sleeve rotatably mounted on the other of said spindles, a gear carried by said sleeve and adapted to mesh with said other gear, hand operating means carried by said sleeve for rotating said flier whereby the line is wound and unwound from said drum, and automatic line releasing and reëngagement means on the flier coöperating with said drum.

5. A casting reel for angling comprising a rod attaching bracket, a pair of non-rotatable spindles carried by the bracket, a winding drum mounted on one of said spindles, means for rendering said drum substantially stationary on the spindle, a rotatable flier having a line engaging portion mounted on said last mentioned spindle, a gear on said spindle and operatively connected with said flier, a sleeve rotatably mounted on the other of said spindles, a gear carried by said sleeve and adapted to mesh with said other gear, hand operating means carried by said sleeve for rotating said flier whereby the line is wound and unwound from said drum, and automatic line release and reëngagement means, means revoluble with the flier for operating said line release and reëngagement means, and means for retarding the movement of said revoluble means.

6. In combination with the winding drum for a line, a revoluble flier for said drum and a guide pivotally mounted on said flier adapted to have motion about the pivot to release and engage the line.

7. In combination with the winding drum for a line, a revoluble flier for said drum, a guide pivotally mounted on said flier adapted to have motion about the pivot to release and engage the line, and means for revolving said flier, said means comprising means for reciprocating the drum with respect to said flier.

8. In combination with the winding drum for a line, a revoluble flier for said drum, line engaging means mounted upon said flier, means in frictional engagement with the flier adapted to operate said line engaging means, whereby the line engaging means automatically releases and engages the line.

9. In combination with the winding drum for a line, a revoluble flier for said drum, line engaging means mounted upon said flier, means in frictional engagement with the flier adapted to operate said line engaging means, whereby the line engaging means automatically releases and engages the line and means for revolving said flier, said latter means comprising means for reciprocating the drum with respect to said flier.

In witness whereof I have hereunto set my hand in the presence of two witnesses.

ALFRED HOLDEN ILLINGWORTH.

Witnesses:
  C. WAUGH,
  ERNEST CLAY.